(12) United States Patent
Naganuma et al.

(10) Patent No.: US 8,176,936 B2
(45) Date of Patent: May 15, 2012

(54) FLUID CUTOFF DEVICE AND GAS METER WITH THE FLUID CUTOFF DEVICE

(75) Inventors: Naoto Naganuma, Nara (JP); Masaki Yamaguchi, Nara (JP); Takehiko Shigeoka, Nara (JP)

(73) Assignee: Panasonic Corporation, Osaka (JP)

( * ) Notice: Subject to any disclaimer, the term of this patent is extended or adjusted under 35 U.S.C. 154(b) by 562 days.

(21) Appl. No.: 12/395,997

(22) Filed: Mar. 2, 2009

(65) Prior Publication Data

US 2010/0102258 A1 Apr. 29, 2010

(30) Foreign Application Priority Data

Oct. 23, 2008 (JP) ............................. P. 2008-272764
Oct. 30, 2008 (JP) ............................. P. 2008-279443
Feb. 12, 2009 (JP) ............................. P. 2009-029803

(51) Int. Cl.
*F16K 31/00* (2006.01)
(52) U.S. Cl. .................... 137/557; 251/129.04; 340/632
(58) Field of Classification Search ............. 251/129.04; 137/557, 456, 459, 460; 340/605, 632; 73/40.5 R
See application file for complete search history.

(56) References Cited

U.S. PATENT DOCUMENTS

| | | | | |
|---|---|---|---|---|
| 5,261,268 A | * | 11/1993 | Namba ....................... | 73/40.5 R |
| 5,554,976 A | * | 9/1996 | Miyauchi et al. ............ | 340/626 |
| 5,866,802 A | * | 2/1999 | Kimata et al. ............... | 73/40.5 R |
| 5,908,980 A | * | 6/1999 | Hwang et al. ................ | 73/40 |
| 5,988,524 A | | 11/1999 | Odajima et al. | |
| 6,441,744 B1 | | 8/2002 | Adams et al. | |
| 6,536,469 B2 | | 3/2003 | Dilger et al. | |
| 6,539,315 B1 | | 3/2003 | Adams et al. | |
| 6,860,288 B2 | * | 3/2005 | Uhler ............................ | 137/552 |
| 6,895,351 B2 | | 5/2005 | Grumstrup et al. | |
| 6,903,659 B2 | | 6/2005 | Vanderah et al. | |
| 6,994,309 B2 | * | 2/2006 | Fernandez-Sein ....... | 251/129.04 |
| 7,064,671 B2 | | 6/2006 | Vanderah et al. | |
| 7,147,204 B2 | * | 12/2006 | Hollingsworth et al. | 251/129.04 |
| 2006/0118746 A1 | * | 6/2006 | Gebler et al. ............. | 251/129.04 |

FOREIGN PATENT DOCUMENTS

| | | |
|---|---|---|
| EP | 1067367 A1 | 1/2001 |
| EP | 1376074 A2 | 1/2004 |
| GB | 2231668 A | 11/1990 |
| GB | 2344672 A | 6/2000 |
| JP | 60-157696 A | 8/1985 |
| JP | 09-043012 A | 2/1997 |
| JP | 9-152901 A | 6/1997 |
| RU | 22-224 U1 | 3/2002 |
| RU | 52-228 U1 | 3/2006 |
| RU | 2292577 C2 | 1/2007 |

OTHER PUBLICATIONS

European Search Report for European Application No. 09154117.7, dated Jan. 28, 2010, 7 pages.

* cited by examiner

*Primary Examiner* — John Bastianelli
*Assistant Examiner* — Ian Paquette
(74) *Attorney, Agent, or Firm* — Brinks Hofer Gilson & Lione

(57) ABSTRACT

By removably disposing a fluid cutoff device in a gas piping, a gas cutoff management function for remote cutting-off/return, etc., can be added to an existing flow measuring unit, and a communicating portion can make bidirectional communications, so that by transmitting an acceptance state of a remote operation from the external device to the external device, higher reliability and safety can be realized, and by detecting use with the fluid cutoff device removed, safety can be further improved while unauthorized use is prevented.

13 Claims, 11 Drawing Sheets

_US 8,176,936 B2_

FLUID CUTOFF DEVICE AND GAS METER WITH THE FLUID CUTOFF DEVICE

RELATED APPLICATIONS

This application claims priority under 35 U.S.C. §119 to Japanese Patent Application Nos. JP2008-272764 filed on Oct. 23, 2008, JP2008-279443 filed on Oct. 30, 2008, and JP2009-029803 filed on Feb. 12, 2009, the entire contents of which are hereby incorporated by reference.

BACKGROUND OF THE INVENTION

1. Field of the Invention

The present invention relates to a fluid control device which opens and closes a flow passage, and specifically, to a fluid cutoff device which is removably disposed in the middle of piping separately from a flow measuring unit such as a gas meter.

2. Related Art

To prevent gas accidents, a variety of safety equipment is conventionally used. Such safety equipment composes a gas leak detector interlocking cutoff system including a gas leak detector and a gas cutoff valve driving device. On the other hand, there is such a cutoff system in which a gas meter and a gas cutoff device are configured separately from each other. As shown in FIG. 11, a gas leak detecting alarm 31 and a cutoff valve driving device 32 are electrically connected via a controller 33, and when the alarm 31 detects a gas leak, after it continuously outputs an alarm for a predetermined time or more, the gas flow passage is automatically closed and the gas supply is stopped to prevent further gas leaks.

The controller 33 maintains safety by preventing further gas leak by closing the cutoff valve driving device 32 in response to gas leaks detection by the alarm 31 (for example, refer to JP S60-157696A).

In recent years, to pursue safety, a gas meter including a flow detector and a gas cutoff device integrated with each other has become mainstream, and for example, the gas meter includes a cutoff judging means for judging whether an abnormality occurs based on signals from the flow detector and an external sensor means, a cutoff means for cutting-off gas supply when an abnormality occurs, a return means for automatically returning the cutoff means based on a signal from the external sensor means, and a leak judging means for judging whether the gas is flowing immediately after the return, and even after the gas is cutoff due to occurrence of an abnormality, automatic return can be made with ease (for example, refer to JP H09-152901A).

However, in recent years, gas use conditions have become complicated, and when the former configuration (configuration in which a gas meter and a gas cutoff device are separated from each other) and the latter configuration (configuration in which a gas meter and a gas cutoff device are integrated together) are combined and used, for example, to make an existing system adapted to a pre-paid system in which a fee is pre-paid before using the gas, a system in which a gas cutoff valve driving device is provided separately from an existing flow measuring unit which measures an amount of gas usage flow is considered so that, for example, a gas cutoff valve driving device is attached separately to an existing system of the latter configuration as in the case of the former configuration. In this case, when a gas meter as a flow measuring unit which measures an amount of gas usage measures a predetermined amount of gas usage, the gas supply is stopped by closing the gas flow passage by the gas cutoff device, however, the gas cutoff device may be removed from the piping and the gas meter is used intentionally, and there is concern that unauthorized use of gas cannot be prevented and safety in gas use cannot be secured.

The present invention solves the above-described conventional problems, and an object thereof is to increase safety while preventing unauthorized use by notifying an external device of removal of the gas cutoff device from the piping via a communicating portion.

To solve the above-described conventional problems, a first aspect of the invention provides a fluid cutoff device which is provided separately from a flow measuring unit which measures a flow, including: an inlet connector and an outlet connector removably connectable to a piping; a fluid passage from the inlet connector to the outlet connector; a valve seat which forms a shutoff portion in the fluid passage; a valve body which is disposed inside the fluid passage and which opens and closes the valve seat; a cutoff valve driving device which electrically drives the valve body and has a conducting portion disposed outside the fluid passage; a communicating portion for radio communications; a controller which receives a remote cutoff/return command from an external device via the communicating portion and makes the cutoff valve driving device perform an operation for cutoff/return driving; and a battery which supplies electric power to the controller, the communicating portion, and the cutoff valve driving device via the controller, wherein when the controller receives the remote cutoff/return command, it makes bidirectional communications to make the cutoff valve driving device perform an operation for cutoff/return driving, and to output a response signal to the external device via the communicating portion.

A second aspect of the invention provides a fluid cutoff device which is provided separately from a flow measuring unit which measures a flow, including: an inlet connector and an outlet connector removably connectable to a piping; a fluid passage from the inlet connector to the outlet connector; a valve seat which forms a shutoff portion in the fluid passage; a valve body which is disposed inside the fluid passage and which opens and closes the valve seat; a cutoff valve driving device which electrically drives the valve body and has a conducting portion disposed outside the fluid passage; a communicating portion for radio communications; a controller which receives a remote cutoff/return command via the communicating portion from an external device and makes the cutoff valve driving device perform an operation for cutoff/return driving; and a battery which supplies electric power to the controller, the communicating portion, and the cutoff valve driving device via the controller, and by further including: a converter for converting information of the flow measuring unit into a signal which the controller handles; and a transmitter for transmitting the signal of the converter to the controller, the controller outputs information of the flow measuring unit to the external device via the communicating portion.

A third aspect of the invention provides the fluid cutoff device wherein, specifically, the converter of the second aspect of the invention converts an amount of fluid usage measured by the flow measuring unit into a signal which the controller handles, and the controller outputs the used flow measured by the flow measuring unit to the external device via the communicating portion.

A fourth aspect of the invention provides the fluid cutoff device wherein, specifically, when the controller of the second aspect of the invention receives a remote cutoff/return command from the external device via the communicating portion, the controller makes the cutoff valve driving device perform an operation for cutoff/return driving, and makes bidirectional communications so as to output a response signal to the external device via the communicating portion.

The fluid cutoff device of the present invention is provided separately from the flow measuring unit which measures the used flow and removably connected to a piping, so that an existing flow measuring unit such as a gas meter can be additionally provided with a collecting function for collecting an amount of fluid usage measured by the flow measuring unit by a remote operation and a gas cutting-off management function for cutting-off and return, etc.

The communicating portion makes bidirectional communications, and when the controller receives a remote cutoff/return command from the outside via the communicating portion, the controller makes the cutoff valve driving device perform an operation for cutoff/return driving, and outputs a command receiving/execution response to the external device via the communicating portion, so that execution of an opening/closing operation of the cutoff valve driving device can be reliably confirmed by the external device, and therefore, reliability and safety increase.

Further, in a closed state of the cutoff valve driving device, when the flow is measured by the flow measuring unit provided separately, use with the fluid cutoff device removed can be judged, and unauthorized use can be detected.

In addition, the used flow measured by the existing flow measuring unit can be retrieved from the flow measuring unit, so that according to the state of the used flow, by performing cutting-off and return remotely from the external device, functional improvements can be realized by the synergy between safety improvement and prevention of unauthorized use by remote operations by the flow measuring unit and the fluid cutoff device.

Further, when the connecting state of the transmitter which links the converter disposed in the flow measuring unit and the controller is investigated and it is disconnected, or when an amount of fluid usage measured by the flow measuring unit can be retrieved while the cutoff valve driving device is in a closed state, use with the fluid cutoff device removed can be judged, so that unauthorized use can be detected.

A fifth aspect of the invention provides the fluid cutoff device, wherein, specifically, in a path from the inlet connector to the outlet connector of the first through fourth aspects of the invention, a piping disconnection detector for detecting connecting states of the inlet connector and the outlet connector is disposed, and when the piping disconnection detector detects disconnection from the piping at the inlet connector and the outlet connector, the controller outputs an abnormality call request or an inquiry response for notifying the disconnection to the external device via the communicating portion.

When the piping disconnection detector detects disconnection from the piping at the inlet connector and the outlet connector, the controller outputs an abnormality call request or an inquiry response notifying the disconnection to the external device via the communicating portion, so that use with the fluid cutoff device removed is detected, and safety can be increased while unauthorized use is prevented.

When the flow is measured by the separately provided flow measuring unit while the cutoff valve driving device is in a closed state, use with the fluid cutoff device removed can be judged, however, when the flow cannot be measured by the separately provided flow measuring unit, for example, even if the separately provided flow measuring unit is removed at the same time, use with the fluid cutoff device removed can be reliably detected by the piping disconnection detector.

A sixth aspect of the invention provides the fluid cutoff device, wherein, specifically, a pressure detector is disposed in a path from the inlet connector to the outlet connector of the first through fifth aspects of the invention, and compares a pressure inside the fluid passage detected by the pressure detector with a first predetermined pressure which is set to be smaller than a liquid supply pressure and higher than the atmospheric pressure, when the pressure inside the fluid passage is lower, the controller outputs a signal indicating a pressure drop such as an abnormality call request or an inquiry response to the external device via the communicating portion.

By comparing a pressure inside the fluid passage detected by the pressure detector with a first predetermined pressure which is set to be smaller than a liquid supply pressure and higher than the atmospheric pressure, when the pressure inside the fluid passage is lower, it is judged that the inlet connector and the outlet connector are disconnected and the controller outputs a pressure drop abnormality call request or an inquiry response indicating this situation to the external device via the communicating portion, so that use with the fluid cutoff device removed can be detected and safety can be increased while unauthorized use is prevented.

When the flow is measured by the separately provided flow measuring unit while the cutoff valve driving device is in a closed state, use with the fluid cutoff device removed can be judged, however, when the flow cannot be measured by the separately provided flow measuring unit, for example, in case that the separately provided flow measuring unit is also removed at the same time, by comparing a pressure inside the fluid passage detected by the pressure detector with a first predetermined pressure which is set to be smaller than a liquid supply pressure and higher than the atmospheric pressure, when the pressure inside the fluid passage is lower, use with the fluid cutoff device removed can be reliably detected.

A seventh aspect of the invention provides the fluid cutoff device, wherein, specifically, when the controller of the sixth aspect of the invention receives a return command after remote cutting-off and drives the cutoff valve driving device to return, in a case where a pressure inside the fluid passage detected by the pressure detector does not reach a second predetermined pressure corresponding to a gas supply pressure in a predetermined time, the controller makes the cutoff valve driving device perform an operation for cutoff driving, and outputs an abnormality call request or an inquiry response to the external device via the communicating portion.

When the controller receives a return command after remote cutting-off and drives the cutoff valve driving device to return, in a case where a pressure inside the fluid passage detected by the pressure detector does not reach a second predetermined pressure corresponding to a fluid supply pressure in a predetermined time, it is judged that a return operation after the remote cutting-off was performed while the faucet of the equipment was opened, the controller makes the cutoff valve driving device perform an operation for cutoff driving to avoid the risk of fluid leak, and outputs an abnormality call request or an inquiry response to the external device via the communicating portion, and therefore, safety of return after the remote cutting-off can be increased.

An eighth aspect of the invention provides the fluid cutoff device, specifically, in the first through seventh aspects of the invention, further including a dummy passage which is connectable to the piping and has the same height as that of the fluid passage. With this configuration, construction works such as adjustment of the height of the piping connector on one side of the piping in consideration of the height of the fluid passage of the fluid cutoff device and insertion and attachment of piping separately prepared corresponding to the height of the fluid cutoff device between the flow measuring unit and the piping can be omitted. Therefore, the construction efficiency can be improved in comparison with the fluid cutoff device which does not have the dummy passage.

A ninth aspect of the invention provides a gas meter with a fluid cutoff device, including: a flow measuring unit which measures an amount of gas usage; and the fluid cutoff device which is provided separately from the flow measuring unit, and is connected to the flow measuring unit, wherein the fluid cutoff device including: an inlet connector and an outlet connector removably connectable to a piping; a fluid passage from the inlet connector to the outlet connector; a valve seat which forms a shutoff portion in the fluid passage; a valve body which is disposed inside the fluid passage and which opens and closes the valve seat; a cutoff valve driving device which electrically drives the valve body and has a conducting portion disposed outside the fluid passage; a controller which makes the cutoff valve driving device perform an operation for cutoff/return driving; and a battery which supplies electric power to the cutoff valve driving device via the controller, and when the controller receives a cutoff/return command, the controller makes the cutoff valve driving device perform an operation for cutoff/return driving.

The fluid cutoff device of the present invention can add a fluid cutting-off management function for remote cutting-off and return, etc., to an existing flow measuring unit by removably attaching the fluid cutoff device to a piping, and by enabling bidirectional communications by a communicating portion, an acceptance state of a remote operation from an external device is transmitted to the external device, and reliability and safety can be increased, and further, by detecting use with the fluid cutoff device removed, safety can be further increased while unauthorized use is prevented.

Further, to the existing flow measuring unit, a function for collecting an amount of fluid usage measured by the flow measuring unit by a remote operation and a fluid cutting-off management function for cutting-off and return, etc., can be added.

DETAILED DESCRIPTION OF THE PREFERRED EMBODIMENTS

Hereinafter, examples of the present invention will be described with reference to the drawings. Examples are not intended to limit the present invention.

EXAMPLE 1

Figure 1:
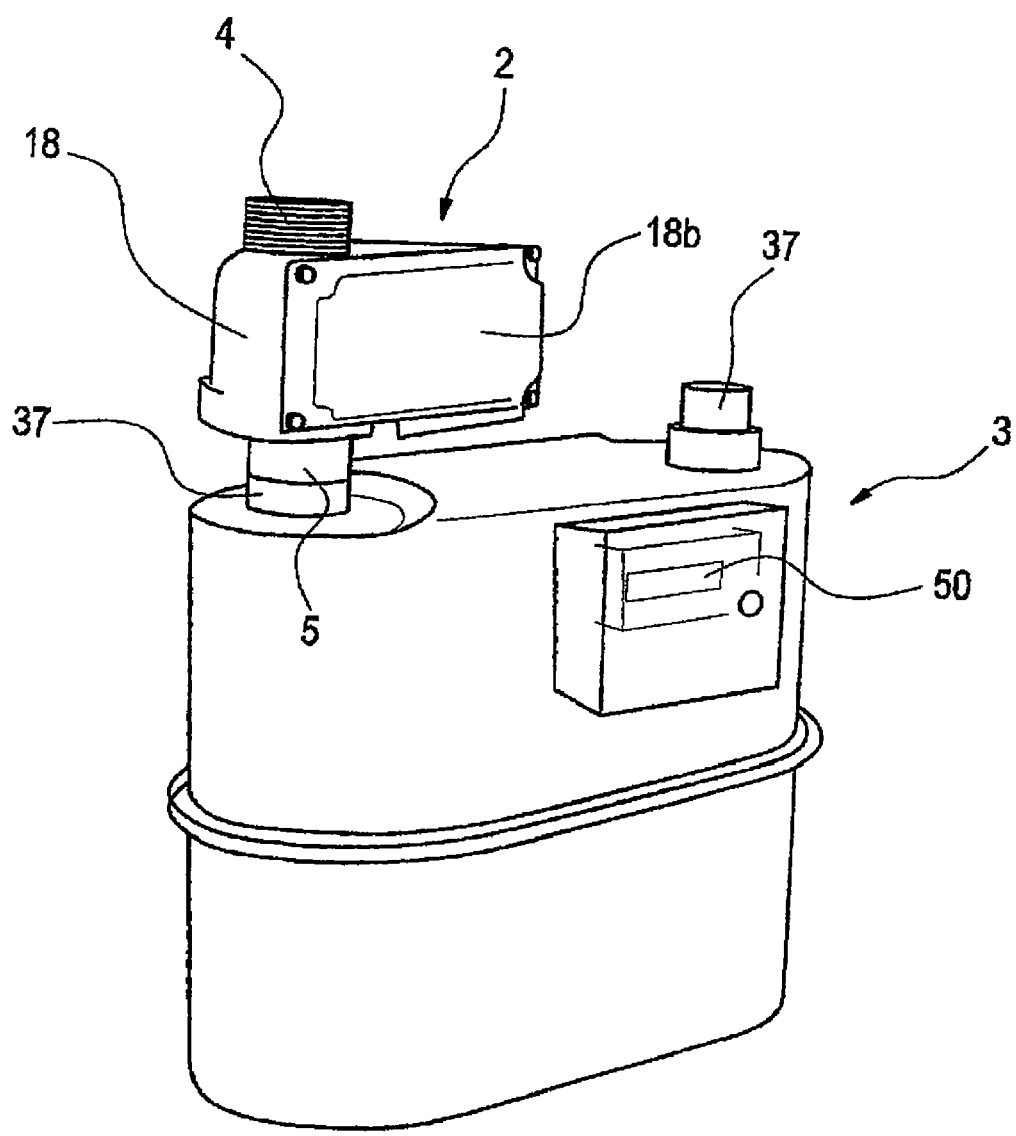
FIG. 1 is a perspective view showing a state where a fluid cutoff device of Example 1 of the present invention is attached to a flow measuring unit.
Figure 2:
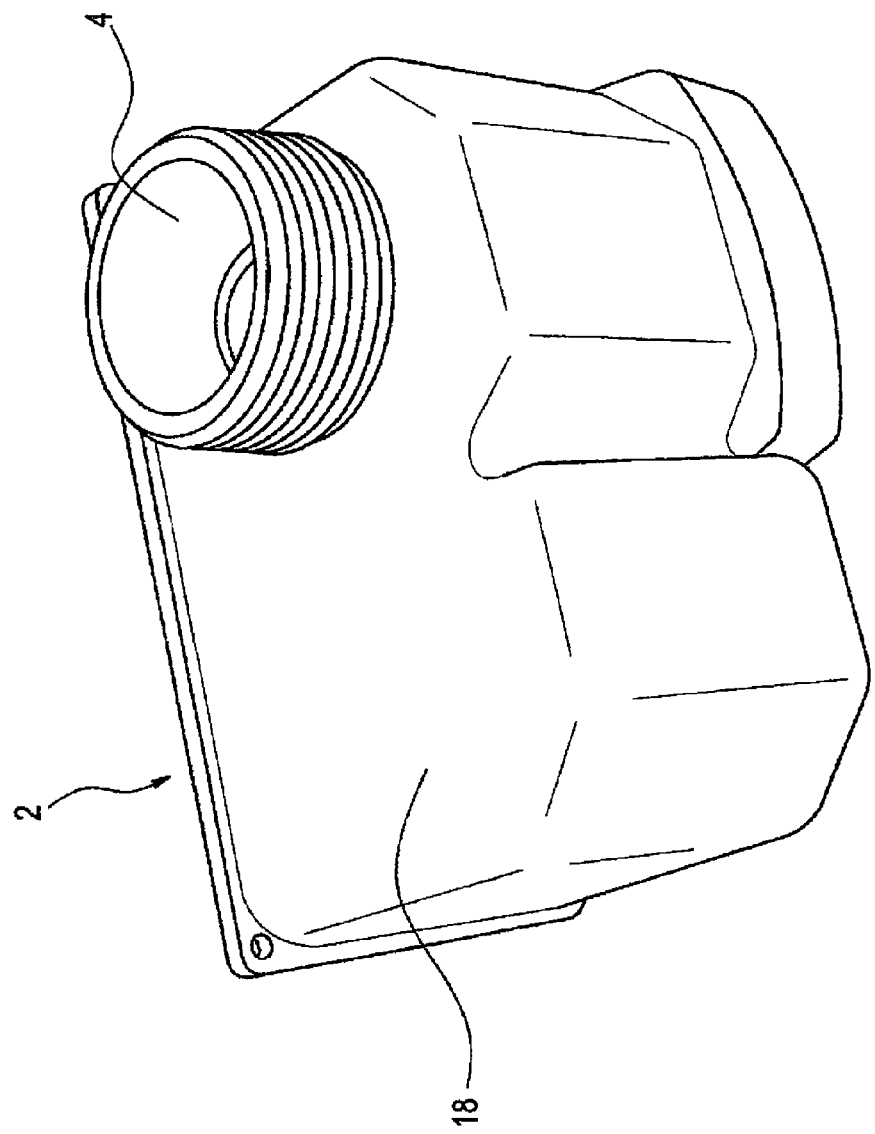
FIG. 2 is a perspective view showing a housing of the same fluid cutoff device.
Figure 3:
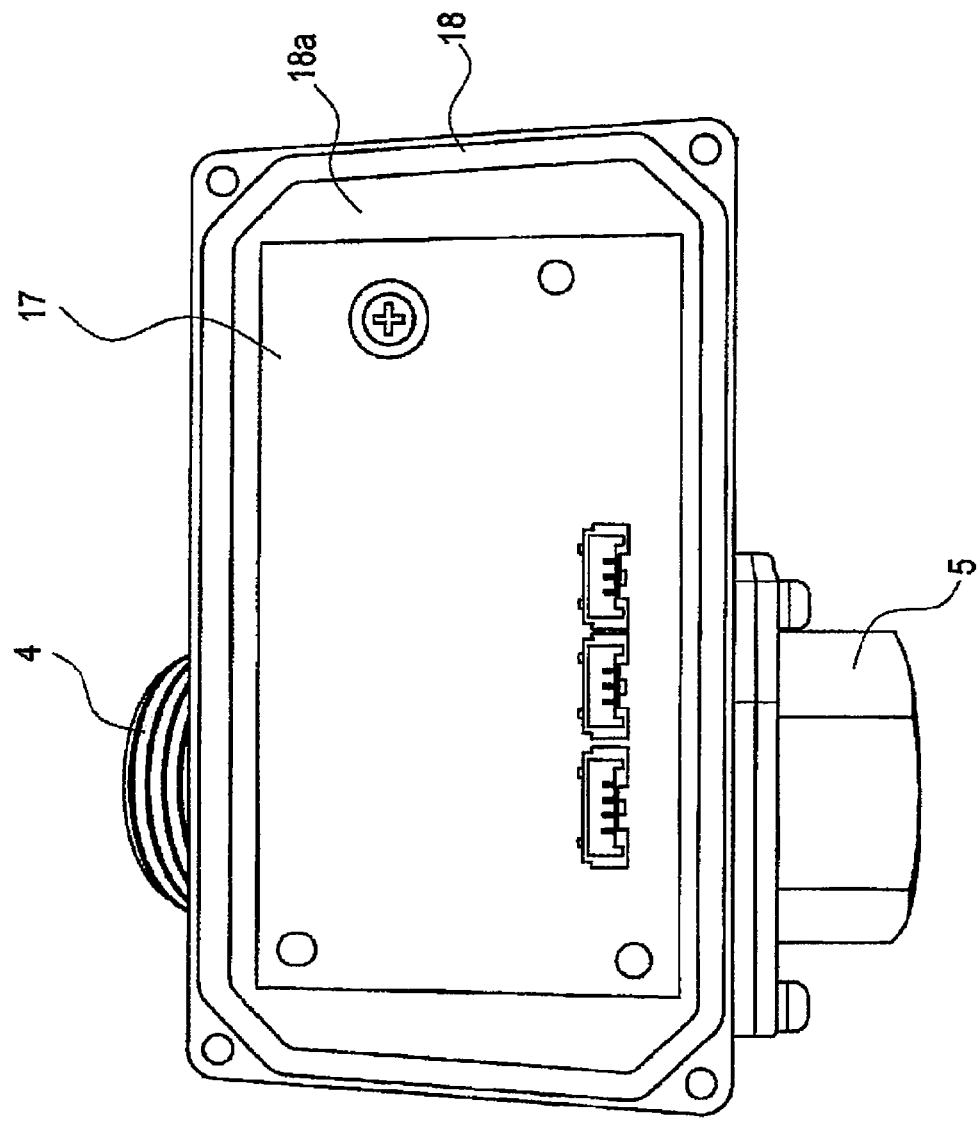
FIG. 3 is a plan view showing a configuration inside the housing of the same fluid cutoff device.
Figure 4:
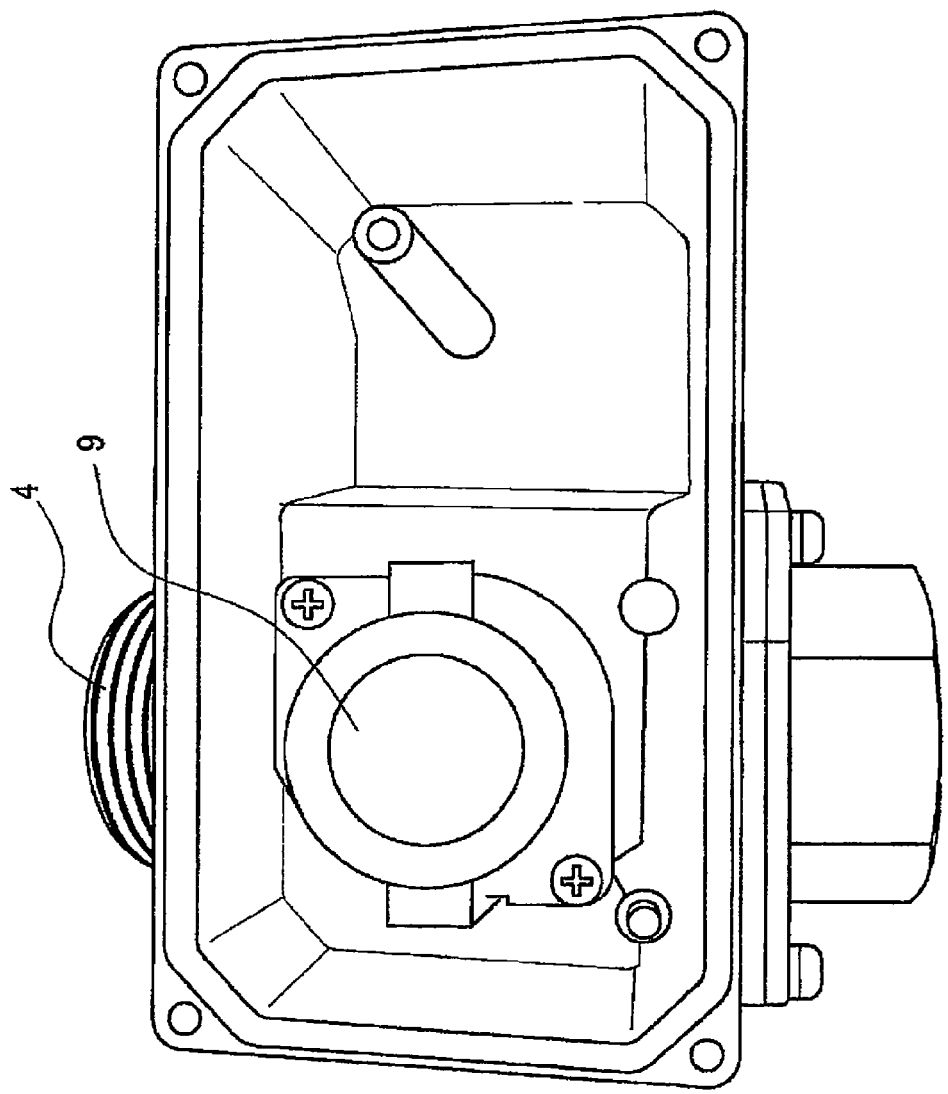
FIG. 4 is a plan view showing a configuration inside the housing in a state where a control board of FIG. 3 is removed.
Figure 5:
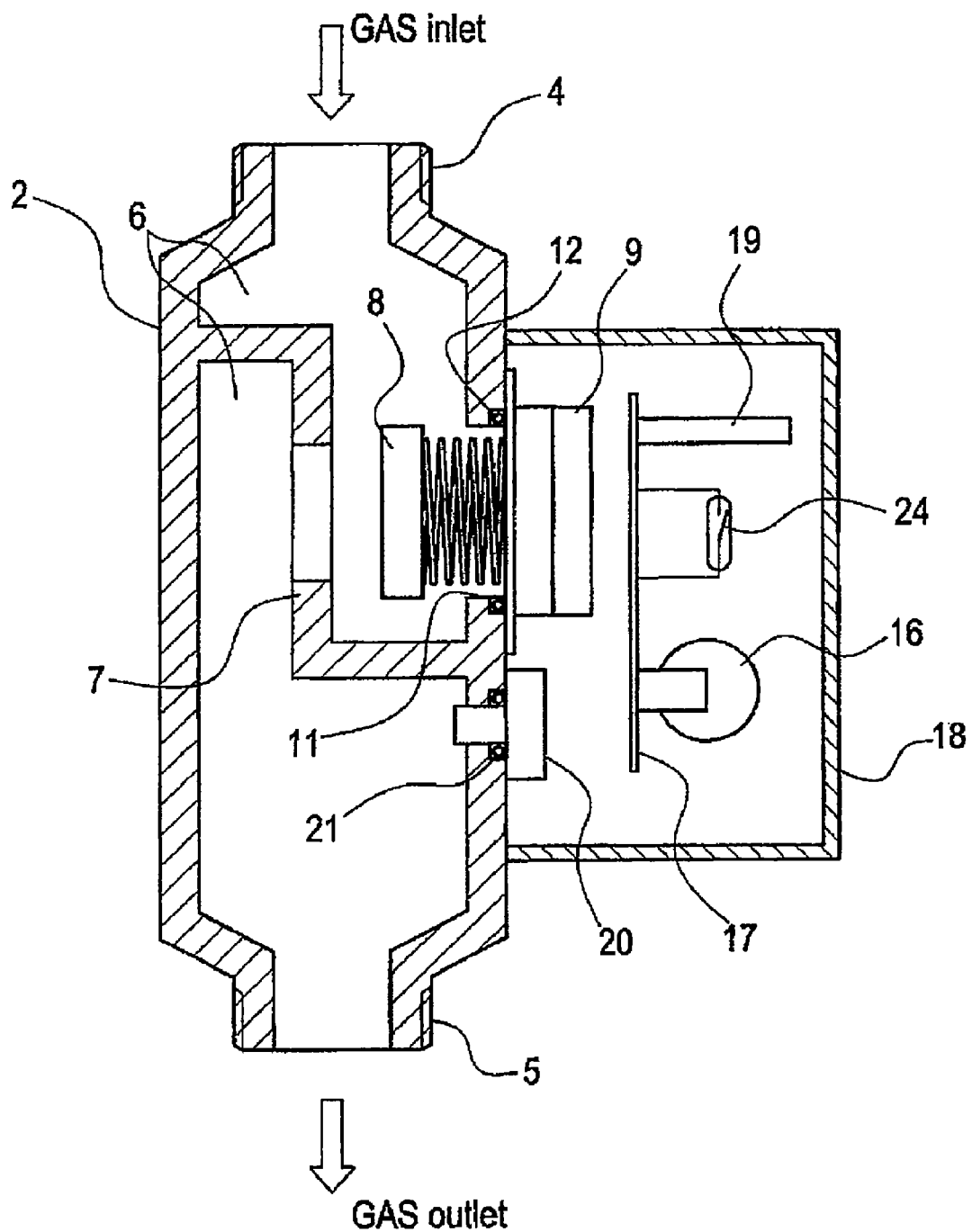
FIG. 5 is a configurational sectional view of the same fluid cutoff device.
Figure 6:
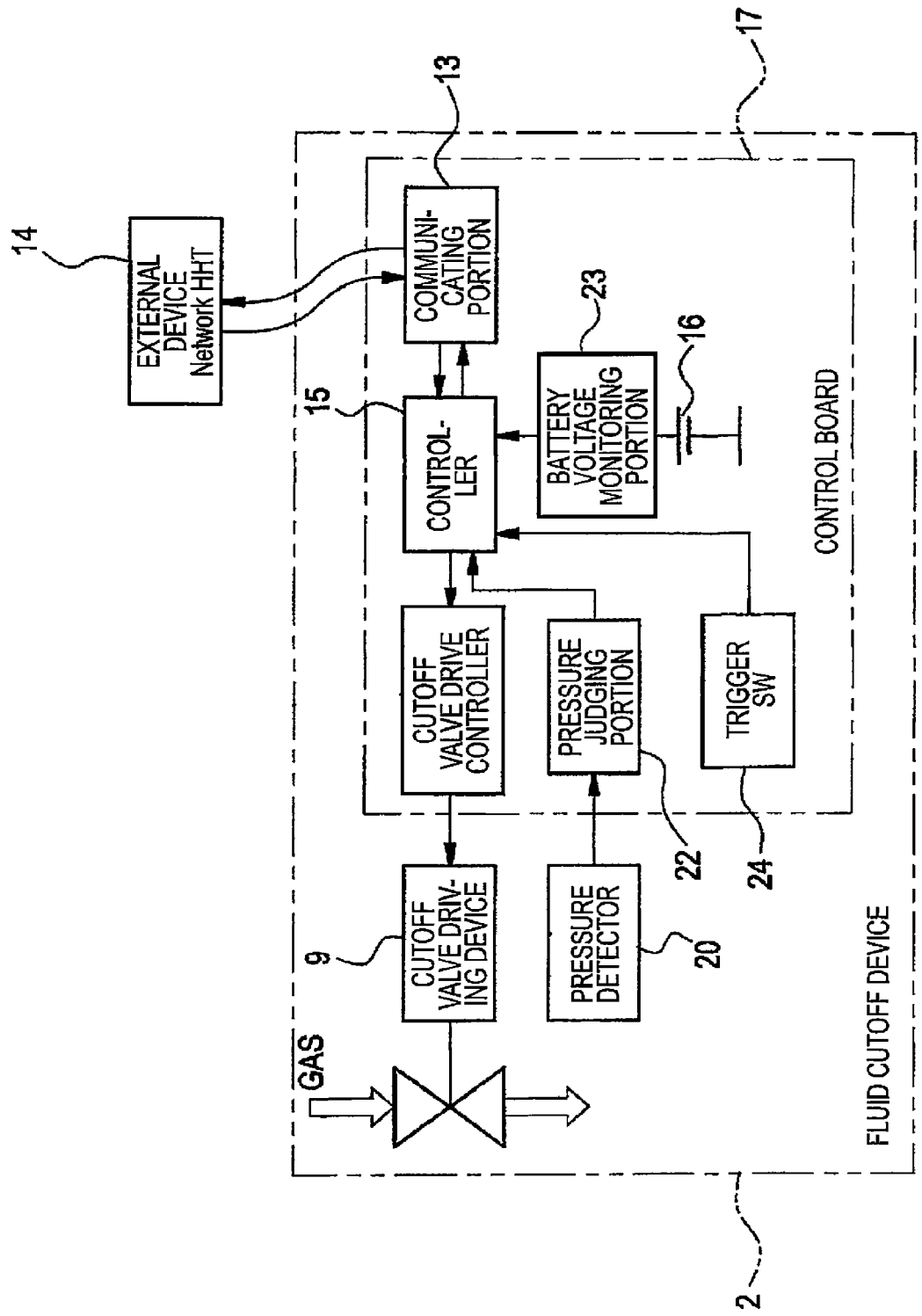
FIG. 6 is a block diagram of the same fluid cutoff device.
Figure 7:
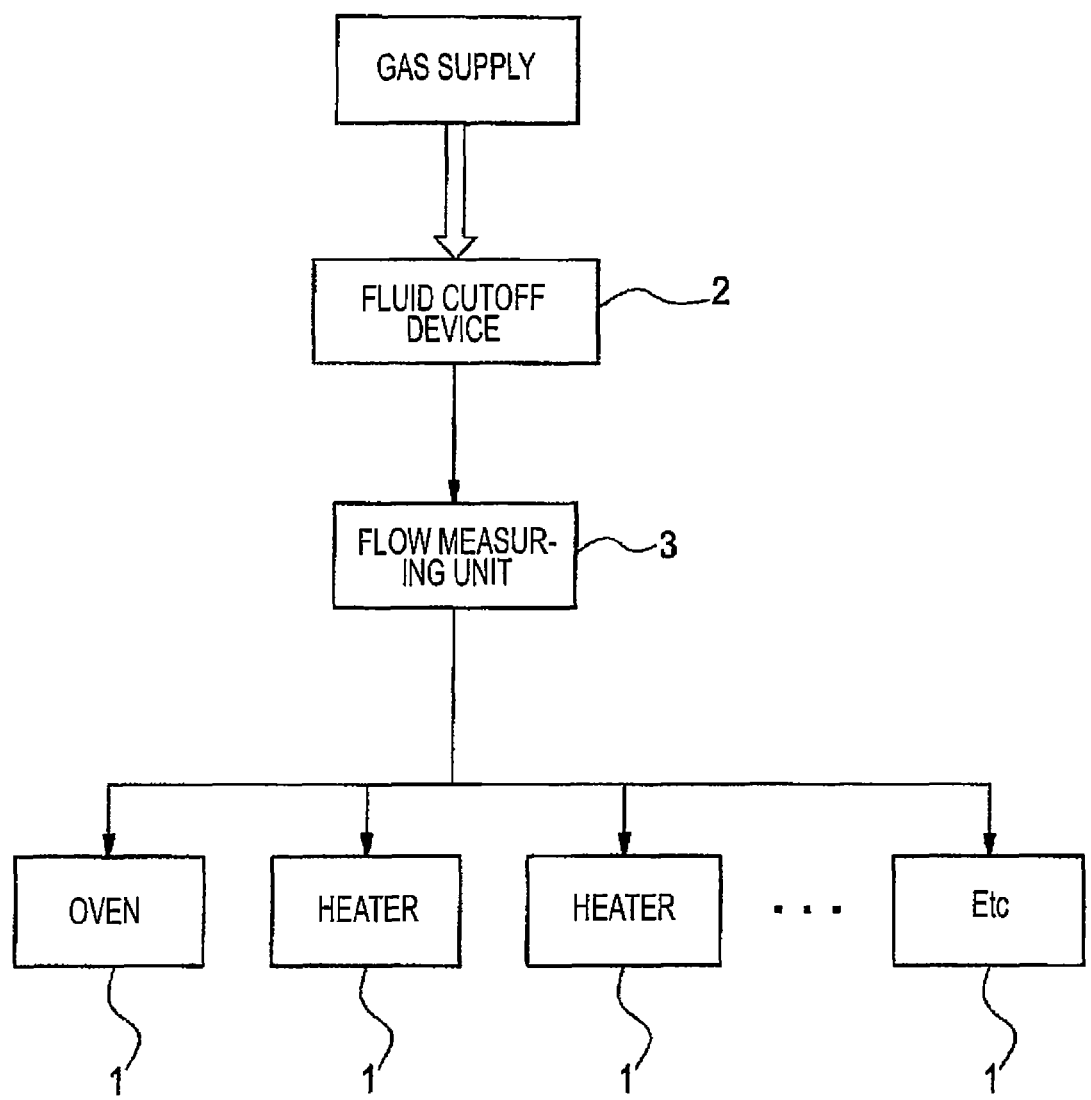
FIG. 7 is a schematic view of a system using the same fluid cutoff device.

FIG. 1 is a perspective view showing a state where a fluid cutoff device of Example 1 of the present invention is attached to a flow measuring unit. FIG. 2 is a perspective view showing a housing of the fluid cutoff device of Example 1 of the present invention. FIG. 3 is a plan view showing a configuration inside the housing of the fluid cutoff device of Example 1 of the present invention. FIG. 4 is a plan view showing a configuration inside the housing in a state where a control board of FIG. 3 is removed. FIG. 5 is a configurational sectional view of the fluid cutoff device of Example 1 of the present invention, FIG. 6 is a block diagram of the same fluid cutoff device, and FIG. 7 is a schematic view of a system using the same fluid cutoff device.

In FIG. 4, gas to be used by equipment 1 such as heaters and oven which a user uses is supplied via a flow measuring unit (gas meter) 3 disposed separately from a fluid cutoff device 2 removably provided in the middle of piping from the gas supply piping. The flow measuring unit 3 is not limited as long as it can measure a gas flow, such as a magnetic sensor, a pressure sensor, an ultrasonic sensor, a heat ray flow sensor, a fluidic element sensor, a mass flow sensor, or a float sensor which detects a gas flow.

Next, the fluid cutoff device 2 will be described.

As shown in FIG. 1, the fluid cutoff device 2 of Example 1 of the present invention is connected to a flow measuring unit 3 which is a gas meter separately provided, and composes the gas meter with a fluid cutoff device, and the fluid cutoff device 2 and the flow measuring unit 3 are connected to the middle of gas piping. A gas inlet connector 4 positioned on the upper surface of the fluid cutoff device 2 is attached to the gas piping, and a gas outlet connector 5 positioned on the lower surface is attached to a connector 37 on a gas inlet side of the flow measuring unit 3. On the front surface of the flow measuring unit 3, a display 50 which displays information such as a measured used gas amount of the flow measuring unit 3 is provided.

In FIG. 1 to FIG. 6, the liquid cutoff device 2 is attached to the gas piping by the gas inlet connector 4 and the gas outlet connector 5 which are removably connectable, and the gas passage 6 inside the fluid cutoff device 2 from the gas inlet connector 4 to the gas outlet connector 5 is made of a heat-resistant material such as metal. The fluid cutoff device 2 is configured so that an opening 18a formed in the front surface of the housing 18 provided with the gas inlet connector 4 and the gas outlet connector 5 is covered by a cover 18b and internal components are housed inside, and inside the housing 18, a gas passage 6 provided with a cutoff valve is formed on the back surface side, and the cutoff valve driving device 9 for driving the cutoff valve and the control board 17 which controls the cutoff valve driving device 9 are housed. The control board 17 is threadably mounted inside the housing 18 so as to become substantially parallel to the gas passage 6 on the back surface side. In this gas passage 6, a valve seat 7 forming a gas shutoff portion is provided, and the valve body 8 which is disposed inside the gas passage 6 and can open and close the valve seat 7 and the cutoff valve driving device 9 which electrically drives the valve body 8 and has a conducting portion disposed outside the gas passage 6 forms a fluid cutoff function.

The cutoff valve driving device 9 is a self-retaining actuator which can electrically perform cutting-off and return and retains a current state of an opened valve or a closed valve in a static condition without inputs of power supply or a drive signal, and has a gas sealing barrier between the movable portion inside, that is, the valve body 8 and a conducting portion, and is disposed at the opening 11 of the gas passage 6 so as to maintain airtightness in the gas passage 6 via a first gas sealing member 12. The valve body 8 as a movable portion inside is moved by a contactless motor such as a stepping motor or a brushless motor to cut-off the gas passage 6 by proximal contact with the valve seat 7.

On a side portion of the fluid cutoff device 2, the control board 17 is provided on which a communicating portion 13 for radio communications, the controller 15 which receives a remote cutoff/return command from an external device 14 such as a handheld terminal or a network via the communicating portion 13 and makes the cutoff valve driving device 9 perform an operation for cutoff/return driving, and the battery 16 such as a lithium primary battery which supplies electric power to the controller 15, the communicating portion 13, and the cutoff valve driving device 9 via the controller 15 are disposed, and to cover these, the housing 18 is provided. This housing 18 also includes and covers an antenna 19 forming a part of the communicating portion 13, so that the surrounding of the antenna 19 is made of a material with low electromagnetic shielding performance such as synthetic resin, and the communicating portion 13 can make bidirectional communications, and when it receives a remote cutoff/return command from the external device 14, the controller 15 makes the cutoff valve driving device 9 perform an operation for cutoff/return driving via the communicating portion 13 from the external device 14, and outputs a response signal of a command receiving/execution response, etc., to the external device 14 via the communicating portion 13.

Further, at an appropriate position of the gas passage 6, a pressure detector 20 for detecting a pressure inside the gas passage 6 is disposed via a second gas sealing member 21 so as to maintain airtightness in the gas passage 6.

The control board 17 has a pressure judging portion 22 for comparing a pressure inside the gas passage 6 detected by the pressure detector 20 with a first predetermined pressure and a second predetermined pressure, and a battery voltage monitoring portion 23 for monitoring a state of the battery such as a lithium primary battery which supplies electric power.

Further, in the controller 15, a trigger SW 24 such as a lead SW is disposed, and in response to a setting start signal from this trigger SW 24, by communicating with the external device 14, the controller makes communication settings such as master-slave alliance, ID registration, and encoding, etc., and stores information on these settings of the communication alliance and encoded information, etc., and outputs setting states in response to inquiry by making setting of option functions and an event (pressure drop interlocking cutoff, etc.) response method when receiving a cutoff system setting command from the external device 14.

In this system, an amount of gas usage by equipment 1 such as heaters and an oven, etc., used by a user is charged based on data of the flow measuring unit (gas meter) 3, and when the gas supply to the user must be stopped for some reason such as default of payment by the user, a gas supply manager remotely operates the separately provided fluid cutoff device 2 by the external device 14 to stop the gas supply to the user.

Similarly, to cancel the stop of the gas supply to the user, the gas supply manager remotely operates the separately provided fluid cutoff device 2 by the external device 14 to start the gas supply to the user. When the controller 15 of the fluid cutoff device 2 to be remotely operated for gas supply cutting-off/return by the external device 14 receives a remote cutoff/return command from the external device 14 via the communicating portion 13, the controller makes the cutoff valve driving device 9 perform an operation for cutoff/return driving, and makes bidirectional communications to output a response signal such as a command receiving/execution response to the external device 14.

Further, when the controller 15 receives a return command after remote cutting-off and drives the cutoff valve driving device 9 to return, in the case where the pressure judging portion 22 judges that a pressure inside the gas passage 6 detected by the pressure detector 20 does not reach the second predetermined pressure corresponding to a gas supply pressure in a predetermined time, the controller 15 judges that the return after remote cutting-off was performed while the faucet of the equipment was opened, and to avoid the risk of gas leak, the controller 15 makes the cutoff valve driving device 9 perform an operation for cutoff driving and outputs an abnormality call request or an inquiry response to the external device 14 via the communicating portion 13.

Here, the fluid cutoff device 2 is provided separately from the flow measuring unit which measures an amount of gas usage and is removably connected to the gas piping, so that it can add a gas cutoff management function for cutting-off and return, etc., by remote operations to the flow measuring unit (gas meter) which does not have an existing communication function.

The communicating portion 13 makes bidirectional communications, and when it receives a remote cutoff/return command from the outside, the cutoff valve driving device 9 is made to perform an operation for cutoff/return driving and a command receiving/execution response is output to the external device 14, so that execution of the opening/closing operation of the cutoff valve driving device 9 can be reliably confirmed by the external device 14, and this further increases reliability and safety.

Further, when the separately provided flow measuring unit measures the gas flow while the cutoff valve driving device 9 is in a closed state, use with the fluid cutoff device 2 removed can be judged, and unauthorized use can be detected.

Thus, when the separately provided flow measuring unit measures the gas flow while the cutoff valve driving device 9 is in a closed state, use with the fluid cutoff device 2 removed can be judged, and when the gas flow cannot be measured by the separately provided flow measuring unit, that is, for example, when the separately provided flow measuring unit is also removed at the same time, use with the fluid cutoff device 2 removed can be detected by the pressure detector 2.

In other words, the pressure inside the gas passage 6 detected by the pressure detector 20 is compared with the first predetermined pressure which is set to be smaller than the gas supply pressure and higher than the atmospheric pressure, and when the pressure inside the gas passage 6 is lower, disconnection of the gas inlet connector 4 and the gas outlet connector 5 is judged, and the pressure judging portion 22 outputs a pressure drop signal indicating this state to the external device 14 as a signal relating to the pressure drop such as an abnormality call request or an inquiry response via the communicating portion 13, so that the gas supply manager detects use with the fluid cutoff device 2 removed by the external device 14 and can prevent unauthorized use and increase safety.

Further, when the controller 15 receives a return command after remote cutting-off and drives the cutoff valve driving device 9 to return, in the case where the pressure inside the gas passage 6 detected by the pressure detector 20 does not reach the second predetermined pressure corresponding to the gas supply pressure in a predetermined time, the controller judges that the return after the remote cutting-off was performed while the faucet of the equipment was opened, and to avoid the risk of gas leak, makes the cutoff valve driving device 9 perform an operation for cutoff driving and outputs an abnormality call request or an inquiry response to the external device 14 via the communicating portion 13, and therefore, safety of the return after the remote cutting-off can be increased.

In the Example, on the side portion of the fluid cutoff device 2, the communicating portion 13 for radio communications, the controller 15, and the battery, etc., are disposed and the housing 18 is provided to cover these, however, it is also adoptable that a housing is integrally provided on a casing forming a gas passage 6 and includes the communicating portion 13 for radio communications, the controller 15, and the battery, etc., inside and covers these, and other components are also allowed to have any configuration as long as the object of the present invention is achieved.

Hereinafter, other Examples of the present invention will be described with reference to the drawings. Examples are not intended to limit the present invention. In the following description, only differences in the Examples will be described in detail, and the same components and members as in Example 1 are attached with the same reference numerals as in Example 1, and descriptions thereof are omitted.

EXAMPLE 2

Figure 8:
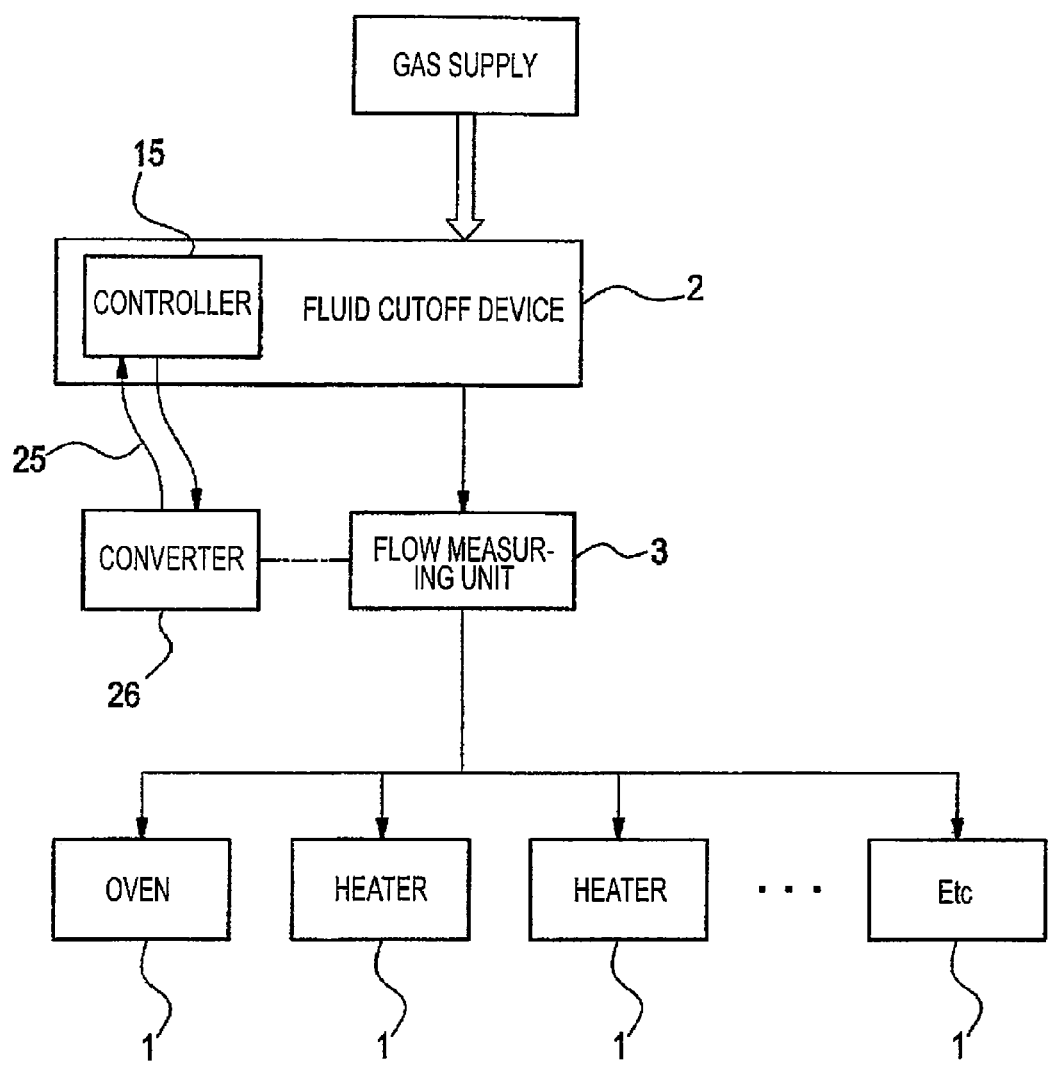
FIG. 8 is a schematic view of a system using a fluid cutoff device of Example 2 of the present invention.
Figure 9:
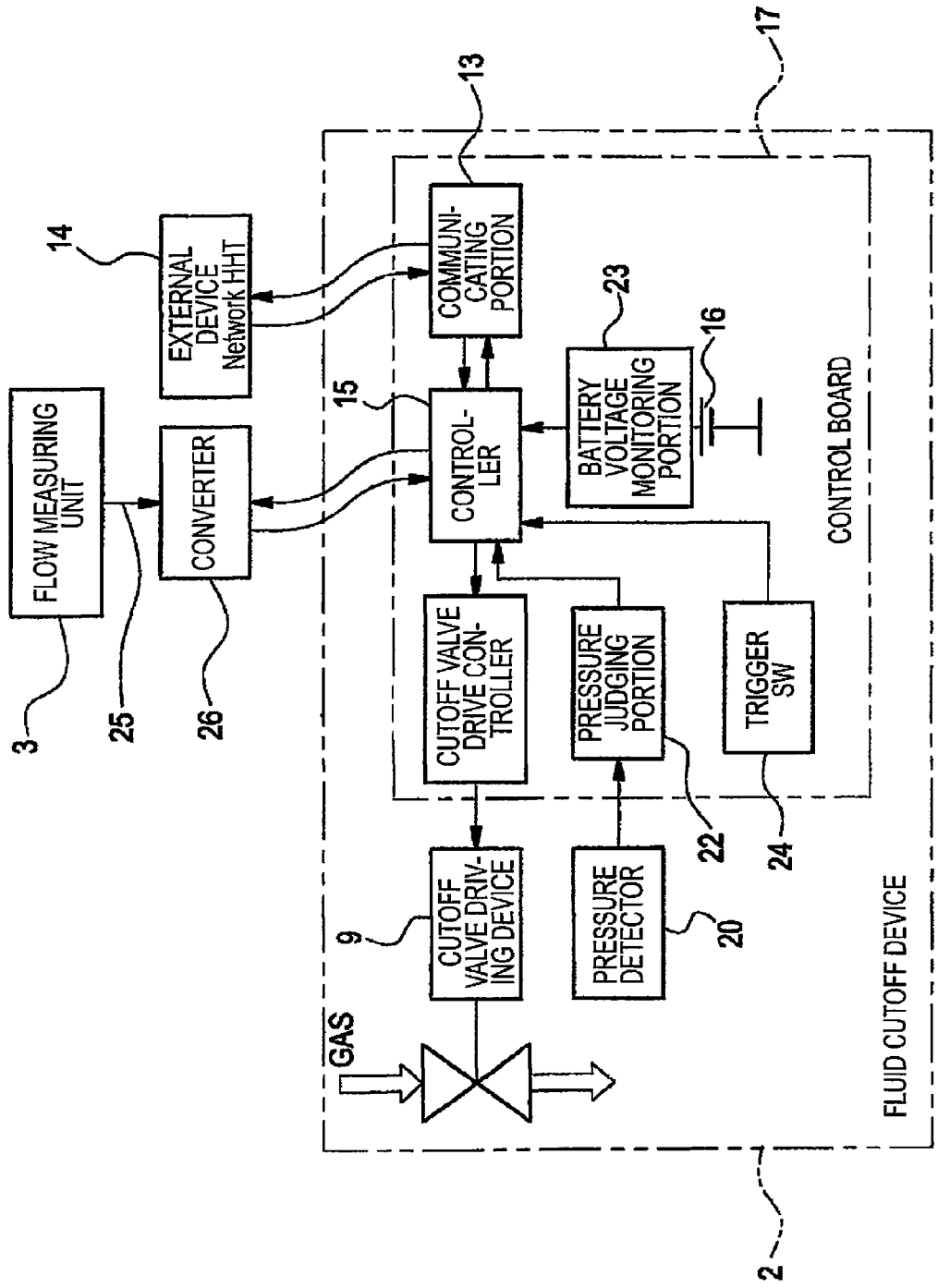
FIG. 9 is a block diagram of the same fluid cutoff device.

FIG. 8 is a schematic view of a system using a fluid cutoff device of Example 2 of the present invention, and FIG. 9 is a block diagram of the same fluid cutoff device.

In FIG. 8, the flow measuring unit 3 shown in Example 2 is a gas meter which measures an amount of gas usage, having the same configuration as in Example 1.

The fluid cutoff device 2 of Example 2 has the same basic configuration as that of the fluid cutoff device of Example 1 shown in FIG. 5, and is disposed separately from the flow measuring unit 3, and is removably connected to the gas supply piping. In the fluid cutoff device 2 of Example 2, as shown in FIG. 8 and FIG. 9, a converter 26 for converting the amount of gas usage measured by the flow measuring unit 3 into a signal is further provided, and the converter 26 outputs the amount of gas usage measured by the flow measuring unit 3 to the controller 15 of the fluid cutoff device 2 via a transmitter 25, and the controller 15 of the fluid cutoff device 2 outputs the amount of gas usage measured by the flow measuring unit 3 to the external device 14 via the communicating portion 13.

Further, as in the case of Example 1, on the side portion of the fluid cutoff device 2, a control board 17 is provided on which the communicating portion 13 for radio communications, the controller 15 which receives a remote cutoff/return command from the external device 14 such as a handheld terminal or network via the communicating portion 13 and makes the cutoff valve driving device 9 perform an operation for cutoff/return driving, and the battery 16 such as a lithium primary battery which supplies electric power to the controller 15, the communicating portion 13, and the cutoff valve driving device 9 via the controller 15, are disposed, and a housing 18 is provided to cover these. This housing 18 also includes and covers an antenna 19 forming a part of the communicating portion 13, so that the surrounding of the antenna 19 is made of a material with low electromagnetic shielding performance such as synthetic resin, and the communicating portion 13 can make bidirectional communications, and when it receives a remote cutoff/return command from the external device 14, the controller 15 makes the cutoff valve driving device 9 perform an operation for cutoff/return driving from the external device 14 via the communicating portion 13, and outputs a command receiving/execution response and an amount of gas usage measured by the flow measuring unit, etc., to the external device 14 via the communicating portion 13.

In the system of Example 2, gas to be used by equipment 1 such as heaters and oven which a user uses is measured by the flow measuring unit 3, and the measured amount of gas usage is converted into a signal by the converter 26 and output to the controller 15 of the fluid cutoff device 2 via the transmitter 25, and the controller 15 of the fluid cutoff device 2 outputs the amount of gas usage measured by the flow measuring unit 3 to the external device 14 via the communicating portion 13. The transmitter 25 may be wired or wireless, and is not limited as long as it can communicate signals between the converter 26 and the controller 15 of the fluid cutoff device 2 and the connection state of the transmitter can be detected by the controller 15.

The amount of gas usage is charged based on data of the flow measuring unit 3 output to the external device 14, and when the gas supply to the user must be stopped for some reason such as default of payment by the user, a gas supply manager remotely operates the separately provided fluid cutoff device 2 by the external device 14 to stop the gas supply to the user.

Similarly, to cancel the stop of the gas supply to the user, the gas supply manager remotely operates the separately provided fluid cutoff device 2 by the external device 14 to start the gas supply to the user. When the controller 15 of the fluid cutoff device 2 to be remotely operated for gas supply cutting-off/return by the external device 14 receives a remote cutoff/return command from the external device 14 via the communicating portion 13, the controller 15 makes the cutoff valve driving device 9 perform an operation for cutoff/return driving, and makes bidirectional communications to output a response signal such as a command receiving/execution response to the external device 14.

Further, when the controller 15 receives a return command after remote cutting-off and drives the cutoff valve driving device 9 to return, in the case where the pressure judging portion 22 judges that a pressure inside the gas passage 6 detected by the pressure detector 20 does not reach the second predetermined pressure corresponding to a gas supply pressure in a predetermined time, the controller 15 judges that the return after remote cutting-off was performed while the faucet of the equipment was opened, and to avoid the risk of gas leak, the controller makes the cutoff valve driving device 9 perform an operation for cutoff driving and outputs an abnormality call request or an inquiry response to the external device 14 via the communicating portion 13.

Here, the fluid cutoff device 2 is provided separately from the flow measuring unit 3 which measures an amount of gas usage, and is removably connected to the gas piping, so that it can add a collecting function for collecting an amount of gas usage measured by the flow measuring unit 3 and a gas cutoff management function for cutting-off and return, etc., by remote operations to the existing flow measuring unit 3.

The fluid cutoff device 2 can retrieve the amount of gas usage measured by the flow measuring unit 3 from the flow measuring unit 3, so that remote cutting-off/return can be performed from the external device 14 according to the state of the amount of gas usage, and accordingly, functional improvements can be realized by the synergy between safety improvement and prevention of unauthorized use by remote operations by the flow measuring unit 3 and the fluid cutoff device 2.

Further, the connecting state of the transmitter 25 which links the converter 26 disposed in the flow measuring unit 3 and the controller 15 is investigated, and when it is disconnected, or when the amount of gas usage measured by the flow measuring unit 3 can be retrieved while the cutoff valve driving device 9 is in a closed state, use with the fluid cutoff device 2 removed can be judged, so that unauthorized use can be detected.

The communicating portion 13 makes bidirectional communications, and when it receives a remote cutoff/return command from the external device 14, the cutoff valve driving device 9 is made to perform an operation for cutoff/return driving and a command receiving/execution response is output to the external device 14, so that execution of the opening/closing operation of the cutoff valve driving device 9 can be reliably confirmed by the external device 14, and this further increases reliability and safety.

Similar to Example 1, in Example 2, disconnection of the fluid cutoff device 2 and unauthorized use of gas can be detected based on the state of the cutoff valve driving device 9, the result of gas flow measurement by the flow measuring unit 3, and the pressure detected by the pressure detector 20.

In other words, when the gas flow is measured by the separately provided flow measuring unit 3 while the cutoff valve driving device 9 is in a closed state, use with the fluid cutoff device 2 removed can be judged, and unauthorized use can be detected.

Further, the pressure inside the gas passage 6 detected by the pressure detector 20 is compared with the first predetermined pressure set to be smaller than the gas supply pressure and higher than the atmospheric pressure, and when the pressure inside the gas passage 6 is lower, it is judged that the gas inlet connector 4 and the gas outlet connector 5 are disconnected, and the pressure judging portion 22 outputs a pressure drop signal indicating this state as a signal relating to the pressure drop such as an abnormality call request or an inquiry response to the external device 14, so that the gas supply manager detects use with the fluid cutoff device 2 removed by the external device 14 and can prevent unauthorized use and increase safety.

Further, when the controller 15 receives a return command after remote cutting-off and drives the cutoff valve driving device 9 to return, in the case where a pressure inside the gas passage 6 detected by the pressure detector 20 does not reach the second predetermined pressure corresponding to the gas supply pressure in a predetermined time, the controller 15 judges that the return after remote cutting-off was performed while the faucet of the equipment was opened, and to avoid the risk of gas leak, the controller 15 makes the cutoff valve driving device 9 perform an operation for cutoff driving, and outputs an abnormality call request or an inquiry response to the external device 14 via the communicating portion 13, and accordingly, safety of return after the remote cutting-off can be increased.

EXAMPLE 3

Figure 10:
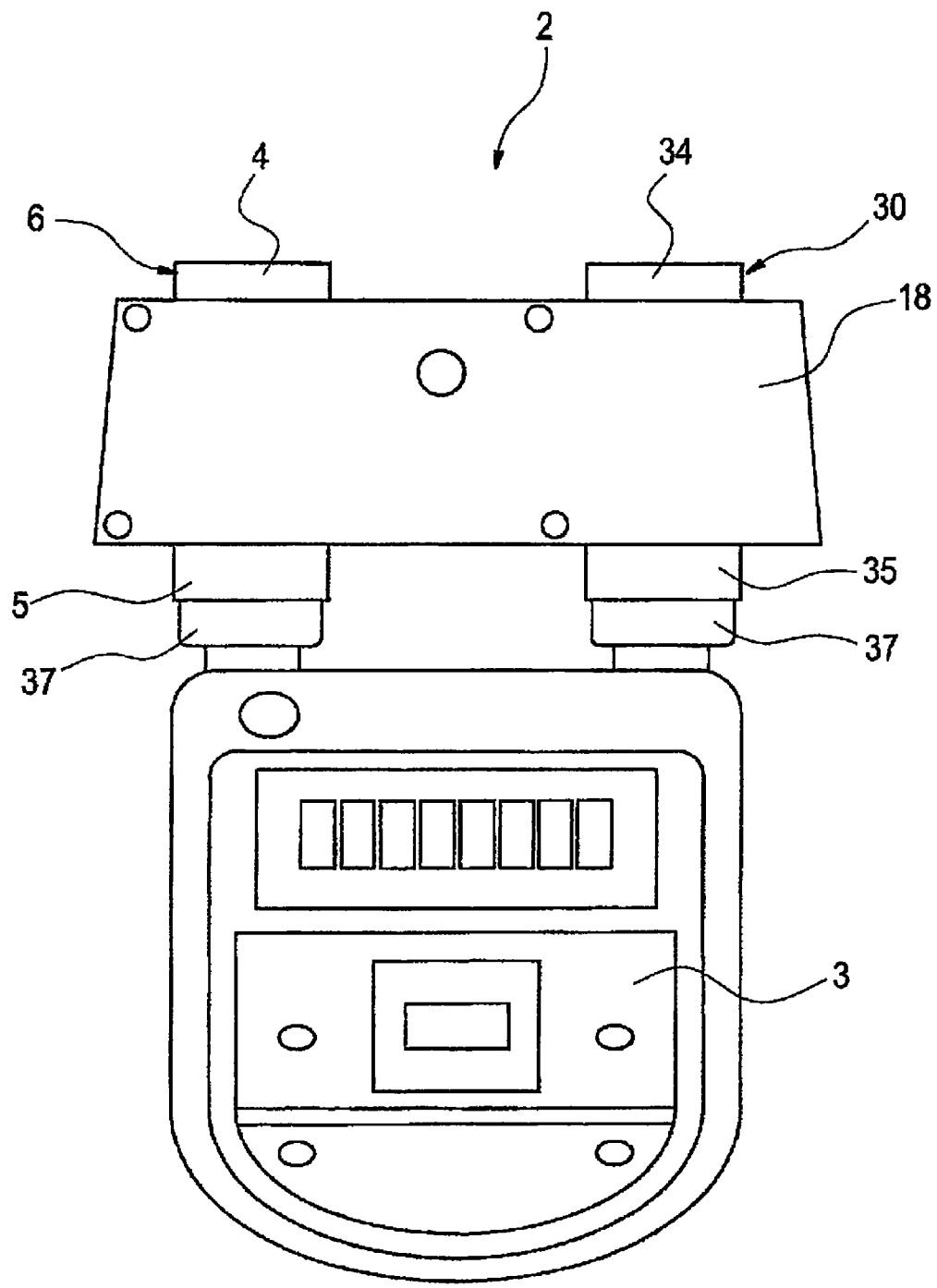
FIG. 10 is a plan view of a fluid cutoff device of Example 3 of the present invention.
Figure 11:
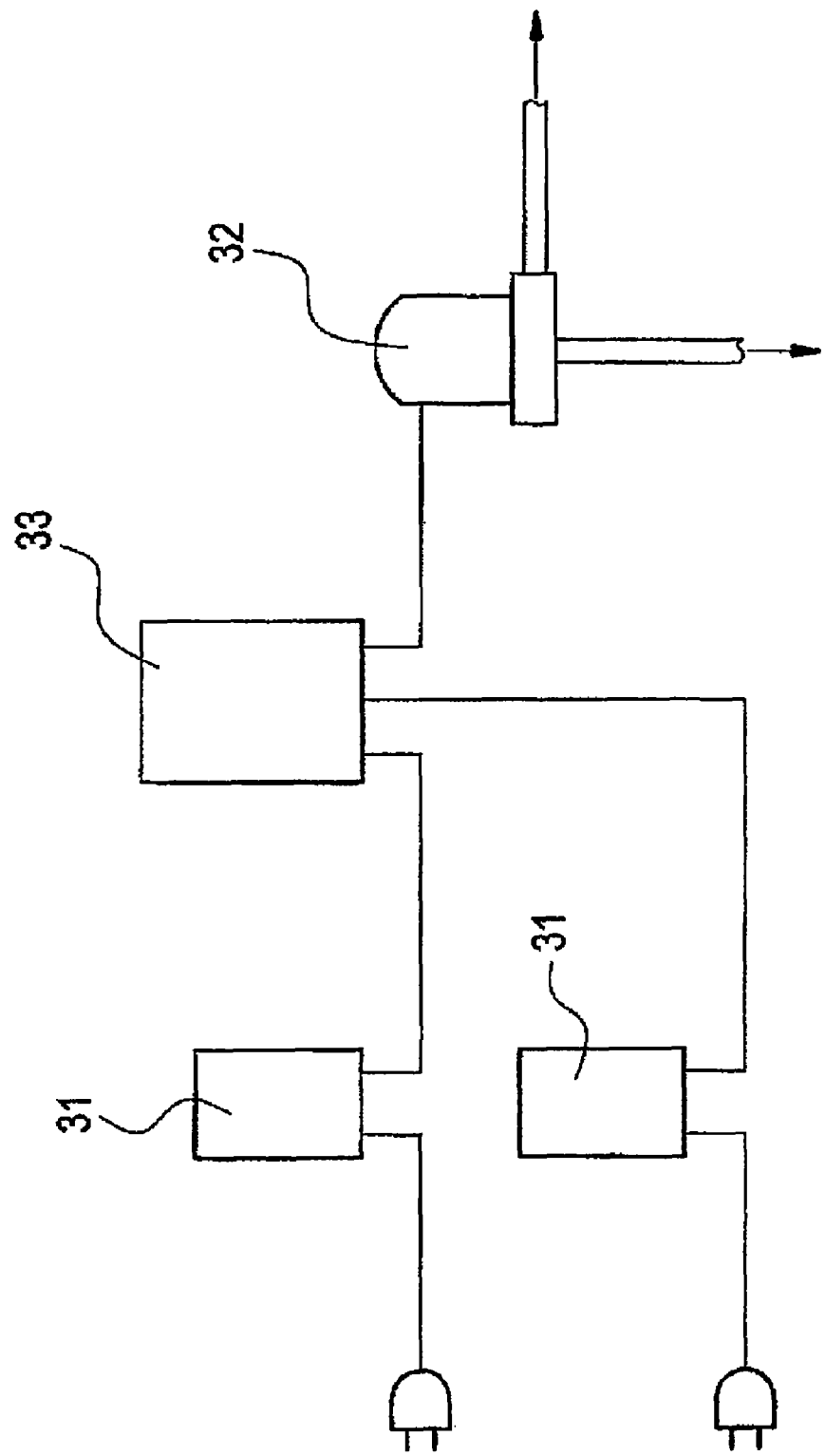
FIG. 11 is a schematic view of a conventional gas leak detector interlocking cutoff system.

FIG. 10 is a plan view of a fluid cutoff device of Example 3 of the present invention.

As shown in FIG. 10, according to the fluid cutoff device 2 of Example 3, a dummy passage 30 having the same height as that of the gas passage 6 in which the fluid cutoff driving device 9 is formed inside is provided inside the housing 18. The dummy passage 30 is formed as a circular tube which has an upper end connector 34 and a lower end connector 35 on both ends. The dummy passage 30 is disposed so that, with respect to the up-down direction of the fluid cutoff device 2, the upper end connector 34 and the gas inlet connector 4 of the fluid cutoff device 2 are at the same height, and the lower end connector 35 and the gas outlet connector 5 are at the same height. The disposition interval between the gas outlet connector 5 and the lower end connector 35 is set equally to the interval between the pair of connectors of the flow measuring unit 3.

When the fluid cutoff device 2 of Example 3 is attached to the flow measuring unit 3, while the two connectors 37 on the flow measuring unit 3 side are held at the same height, the gas outlet connector 5 of the fluid cutoff device 2 and the lower end connector 35 of the dummy passage 30 can be connected. In addition, the gas inlet connector 4 and the upper end side connector 34 of the dummy passage 30 which are connected to the gas piping side are at the same height, so that when the fluid cutoff device 2 and the flow measuring unit 3 are constructed, they can be constructed in the state where the connectors of the gas piping are set at the same height. With this configuration, adjustment of the gas piping height required in the conventional attaching form in which the fluid cutoff device is attached to only one side of gas piping becomes unnecessary. In other words, construction works such as adjustment of the height of the connector on one side of the piping in consideration of the height of the gas passage 6 of the fluid cutoff device 2 and insertion and attachment of piping separately prepared corresponding to the height of the fluid cutoff device 2 between one connector and the gas piping can be omitted. Therefore, in comparison with the case of the fluid cutoff device 3 which does not have the dummy passage, the construction efficiency can be improved.

Except for the dummy passage 30, the fluid cutoff device 2 of Example 3 has the configuration shown in FIG. 5 and FIG. 9 similar to that of the cutoff device of Example 2.

Therefore, as in the case of the Examples described above, when the controller 15 receives a remote cutoff/return command from the external device 14, the controller 15 operates the cutoff valve driving device 9 to cut-off the gas passage 6, and makes bidirectional communications to output a response signal such as a command receiving/execution response, etc., to the external device 14 via the communicating portion.

Further, disconnection of the fluid cutoff device 2 and unauthorized use of gas can be detected based on the state of the cutoff valve driving device 9, the result of gas flow measurement by the flow measuring unit 3, and the pressure detected by the pressure detector 20.

The fluid cutoff device of the present invention is also applicable to a piping system which supplies a gaseous body other than the gas as fuel, such as air, oxygen, nitrogen, or rare gases, or a liquid. In other words, the present invention is applicable to a fluid cutoff device which measures the gaseous body flow by the fluid meter and performs cutting-off/return by referring to signals from external devices and measurement results of the fluid meter.

The description given above shows an example in which an amount of gas usage measured by the flow measuring unit is converted by the converter into a signal which the controller handles and the converted signal is output via the communicating portion, however, it is also adoptable that, other than the used gas (accumulated) flow, other information which the flow measuring unit has, such as measured values relating to the flow, such as the maximum flow and the average flow, and the fluid pressure, the fluid temperature, the time, and the date is converted by the converter into a signal which the controller handles, and the converted signal is output via the communicating portion.

As described above, the present invention can provide a flow cutoff device which is disposed removably in a piping separately from the flow measuring unit, and can add a collecting function for collecting an amount of gas usage measured by the flow measuring unit by a remote operation and a cutoff/return function, and further, when the flow cutoff device detects use with the fluid cutoff device removed from the piping, it transmits this information to the external device via the communicating portion, and can increase safety while preventing unauthorized use, so that the flow cutoff device of the present invention can be applied to gas meter management, etc.

What is claimed is:

1. A fluid shutoff device which is provided separately from a flow measuring unit which measures a flow amount of fluid, comprising:
   an inlet connector and an outlet connector removably connectable in series to a piping for delivering the fluid, one of which is connectable to one of an inlet and an outlet of the flow measuring unit;
   a fluid passage that extends from the inlet connector to the outlet connector to flow the fluid therethrough;
   a cutoff valve that is disposed in the fluid passage and comprises a valve body and a valve seat configured to cooperate with each other to open and close the fluid passage;
   a cutoff valve driving device configured to electrically drive the cutoff valve to open and close the fluid passage, wherein the cutoff valve driving device has a conducting portion disposed outside the fluid passage;
   a communicating portion configured to conduct bidirectional radio communications with an external device;
   a controller responsive to a cutoff/return command received from the external device via the communicating portion to operate the cutoff valve driving device to open or close the fluid passage and output, in response to the command, a response signal to the external device via the communicating portion;
   a battery that supplies electric power to the controller, the communicating portion, and the cutoff valve driving device via the controller; and
   a piping disconnection detector disposed in the fluid passage to detect disconnection of the fluid cutoff device from the piping, wherein when the piping disconnection detector detects disconnection of the fluid cutoff device from the piping, the controller outputs a signal to the external device via the communicating portion to notify disconnection of the fluid cutoff device.

2. The fluid cutoff device according to claim 1, further comprising a dummy passage which is connectable to the piping, wherein the dummy passage has first and second ends which extend respectively in directions of the inlet and outlet connectors at heights substantially equal to those of the corresponding connectors in order to facilitate piping to the fluid cutoff device.

3. The fluid cutoff device according to claim 1, wherein the piping disconnection detector comprises a pressure detector disposed in the fluid passage to detect a pressure in the fluid passage, and the controller compares a detected pressure with a first predetermined pressure which is smaller than a fluid supply pressure in the fluid passage and higher than an atmospheric pressure, and when the detected pressure is lower than the first predetermined pressure, outputs the signal notifying disconnection of the fluid cutoff device from the piping to the external device via the communicating portion.

4. The fluid cutoff device according to claim 3, wherein if the detected pressure does not return to the fluid supply pressure within a predetermined time after the controller operates the cutoff valve driving device to open the fluid passage, the controller operates the cutoff valve driving device to close the fluid passage and outputs an abnormality call request or an inquiry response to the external device via the communicating portion.

5. A fluid cutoff device which is provided separately from a flow measuring unit which measures a usage amount of fluid, comprising:
   a housing that constitutes an enclosure of the fluid cutoff device independently from an enclosure of the flow measuring unit;
   an inlet connector and an outlet connector removably connectable in series to a piping for delivering the fluid, one of which is connectable to one of an inlet and an outlet of the flow measuring unit;
   a fluid passage that extends from the inlet connector to the outlet connector to flow the fluid therethrough;
   a cutoff valve that is disposed in the fluid passage and comprises a valve seat and a valve body configured to cooperate with each other to open and close fluid passage;
   a cutoff valve driving device configured to electrically drive the cutoff valve to open and close the fluid passage, wherein the cutoff valve driving device has a conducting portion disposed outside the fluid passage;
   a communicating portion configured to conduct bidirectional radio communications with an external device;
   a controller responsive to a cutoff/return command received via the communicating portion from the external device to operate the cutoff valve driving device to close or open the fluid passage;
   a battery that supplies electric power to the controller, the communicating portion, and the cutoff valve driving device via the controller;
   a converter configured to convert a signal from the flow measuring unit indicative of a measured usage of fluid into a signal readable by the controller, wherein the controller receives the signal from the converter and outputs information indicative of the measured usage of fluid to the external device via the communicating portion; and
   a piping disconnection detector disposed in the fluid passage to detect disconnection of the fluid cutoff device from the piping, wherein when the piping disconnection detector detects disconnection of the fluid cutoff device from the piping, the controller outputs a signal to the external device via the communicating portion to notify disconnection of the fluid cutoff device.

6. The fluid cutoff device according to claim 5, wherein in response to the cutoff/return command, the controller outputs a response signal to the external device via the communicating portion.

7. The fluid cutoff device according to claim 5, further comprising a dummy passage which is connectable to the piping, wherein the dummy passage has first and second ends which extends respectively in directions of the inlet and outlet connectors at heights substantially equal to those of the corresponding connectors in order to facilitate piping to the fluid cutoff device.

8. The fluid cutoff device according to claim 5, further comprising a piping disconnection detector disposed in the fluid passage to detect disconnection of the fluid cutoff device from the piping, wherein when the piping disconnection detector detects disconnection of the fluid cutoff device from the piping, the controller outputs a signal to the external device via the communicating portion to notify disconnection of the fluid cutoff device.

9. The fluid cutoff device according to claim 8, wherein the piping disconnection detector comprises a pressure detector disposed in the fluid passage to detect a pressure in the fluid passage, and the controller compares a detected pressure with a first predetermined pressure which is smaller than a fluid supply pressure in the fluid passage and higher than an atmospheric pressure, and when the detected pressure is lower than the first predetermined pressure, outputs the signal notifying disconnection of the fluid cutoff device from the piping to the external device via the communicating portion.

10. The fluid cutoff device according to claim 9, wherein if the detected pressure does not return to the fluid supply pressure within a predetermined time, the controller operates the cutoff valve driving device to close the fluid passage and outputs an abnormality call request or an inquiry response to the external device via the communicating portion.

11. A combination of a gas meter and a fluid cutoff device, comprising:
- a flow measuring unit configured to measure an amount of gas usage and has a housing that constitutes an enclosure of the flow measuring unit; and
- a fluid cutoff device that has a housing that constitutes an enclosure of the fluid cutoff device independently from the housing of the flow measuring unit,
- the fluid cutoff device comprising:
    - an inlet connector and an outlet connector removably connectable in series to a piping for delivering gas, one of which is connectable to one of an inlet and an outlet of the flow measuring unit;
    - a fluid passage that extends from the inlet connector to the outlet connector to flow the gas therethrough;
    - a cutoff valve that is disposed in the fluid passage and comprises a valve seat and a valve body configured to cooperate with each other to open and close the fluid passage;
    - a cutoff valve driving device configured to electrically drive the cutoff valve to open and close the fluid passage, wherein the cutoff valve driving device has a conducting portion disposed outside the fluid passage;
    - a communicating portion configured to conduct bidirectional radio communications with an external device;
    - a battery that supplies electric power to the cutoff valve driving device via the controller;
    - a controller responsive to a cutoff/return command received from the external device via the communicating portion to operate the cutoff valve driving device to open or close the fluid passage; and
    - a piping disconnection detector disposed in the fluid passage to detect disconnection of the fluid cutoff device from the piping, wherein when the piping disconnection detector detects disconnection of the fluid cutoff device from the piping, the controller outputs a signal to the external device via the communicating portion to notify disconnection of the fluid cutoff device.

12. The gas meter with a fluid cutoff device according to claim 11, further comprising:
- a converter configured to convert a signal from the flow measuring unit indicative of a measured amount of gas usage into a signal readable by the controller,
- wherein the controller receives the signal from the converter and outputs information indicative of the measured amount of gas usage to the external device via the communicating portion.

13. The gas meter with a fluid cutoff device according to claim 11, wherein in response to the cutoff/return command, the controller outputs a response signal to the external device via the communicating portion.

* * * * *

UNITED STATES PATENT AND TRADEMARK OFFICE
CERTIFICATE OF CORRECTION

| | | |
|---|---|---|
| PATENT NO. | : 8,176,936 B2 | Page 1 of 1 |
| APPLICATION NO. | : 12/395997 | |
| DATED | : May 15, 2012 | |
| INVENTOR(S) | : Naoto Naganuma et al. | |

It is certified that error appears in the above-identified patent and that said Letters Patent is hereby corrected as shown below:

<u>In the Claims</u>

In column 14, claim 5, line 25, after "each other to open and close" insert --the--.

Signed and Sealed this
Tenth Day of July, 2012

David J. Kappos
*Director of the United States Patent and Trademark Office*